United States Patent
Nakashima et al.

(10) Patent No.: US 8,882,621 B2
(45) Date of Patent: Nov. 11, 2014

(54) FRICTION DRIVE BELT

(75) Inventors: Eijiro Nakashima, Hyogo (JP); Shigeki Okuno, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 150 days.

(21) Appl. No.: 13/125,918

(22) PCT Filed: Oct. 6, 2009

(86) PCT No.: PCT/JP2009/005188
§ 371 (c)(1),
(2), (4) Date: May 23, 2011

(87) PCT Pub. No.: WO2010/047051
PCT Pub. Date: Apr. 29, 2010

(65) Prior Publication Data
US 2011/0218069 A1 Sep. 8, 2011

(30) Foreign Application Priority Data
Oct. 23, 2008 (JP) .................. 2008-273450

(51) Int. Cl.
*F16G 1/00* (2006.01)
*F16G 5/00* (2006.01)
*F16G 1/08* (2006.01)
*F16G 1/28* (2006.01)
*F16G 5/06* (2006.01)
*F16G 5/20* (2006.01)

(52) U.S. Cl.
CPC .. *F16G 1/08* (2013.01); *F16G 1/28* (2013.01); *F16G 5/06* (2013.01); *F16G 5/20* (2013.01)
USPC ........................................... 474/260
(58) Field of Classification Search
USPC ......... 474/237, 238, 240, 242, 248, 260, 261, 474/262, 263, 264, 265
See application file for complete search history.

(56) References Cited

U.S. PATENT DOCUMENTS 5,254,050 A * 10/1993 Nakajima et al. ............. 474/260
6,056,656 A * 5/2000 Kitano et al. ................. 474/268
(Continued)

FOREIGN PATENT DOCUMENTS

CN 1540183 10/2004
(Continued)

OTHER PUBLICATIONS

International Search Report, PCT/JP2009/005188, Nov. 2, 2009.
Partial Translation of previously submitted Japanese Unexamined Patent Publication No. 2005-212952.

*Primary Examiner* — Sang Kim
*Assistant Examiner* — Juan Campos, Jr.
(74) *Attorney, Agent, or Firm* — Young & Thompson

(57) ABSTRACT

A friction drive belt includes: an adhesion rubber layer having a core wire embedded therein so as to form a helical pattern having a pitch in a lateral direction of the belt; a compression rubber layer provided on a surface of the adhesion rubber layer located on an inner side of the belt, and serving as a portion that is to contact pulleys, and a backing rubber layer provided on a surface of the adhesion rubber layer located on an outer side of the belt, and serving as a back portion of the belt. A ratio of tensile stress at 10% elongation of a rubber composition forming the adhesion rubber layer to that of a rubber composition forming the backing rubber layer is 1.77 or more, as measured in a longitudinal direction of the belt at an ambient temperature of 25° C. according to JIS K 6251.

14 Claims, 4 Drawing Sheets

(56) References Cited

U.S. PATENT DOCUMENTS

| | | | |
|---|---|---|---|
| 6,153,686 A * | 11/2000 | Granatowicz et al. | 524/511 |
| 6,616,558 B2 * | 9/2003 | South | 474/260 |
| 2004/0214674 A1 | 10/2004 | Tachibana et al. | |
| 2005/0096433 A1 | 5/2005 | Takehara et al. | |
| 2007/0249450 A1 * | 10/2007 | Shiriike | 474/260 |
| 2009/0011884 A1 * | 1/2009 | Nakashima et al. | 474/205 |

FOREIGN PATENT DOCUMENTS

| | | | |
|---|---|---|---|
| CN | 1641245 | 7/2005 | |
| JP | 6-14590 | 2/1994 | |
| JP | 07-269658 | 10/1995 | |
| JP | 10-103413 | 4/1998 | |
| JP | 2005-212952 | 8/2005 | |
| WO | WO 2007102310 A1 * | 9/2007 | F16G 5/20 |

* cited by examiner

FRICTION DRIVE BELT

TECHNICAL FIELD

The present invention relates to friction drive belts that have an adhesion rubber layer having a core wire embedded therein so as to form a helical pattern having a pitch in the lateral direction of the belt, a compression rubber layer provided on a surface of the adhesion rubber layer located on the inner side of the belt, and serving as a portion that is to contact pulleys, and a backing rubber layer provided on a surface of the adhesion rubber layer located on the outer side of the belt, and serving as a back portion of the belt.

BACKGROUND ART

Friction drive belts such as V-ribbed belts are typically configured to have a stacked structure of an adhesion rubber layer having a core wire embedded therein and a compression rubber layer serving as a portion that is to contact pulleys.

Patent Document 1 discloses that since stress is intensively applied to a specific part of the interface between an adhesion rubber layer and a compression rubber layer when a belt is subjected to a tensile or bending force, and such concentration of stress can cause cracks in the belt, fibrillated short fibers, which are made of aramid fibers, cotton, or silk, are contained in the adhesion rubber layer in order to reduce the difference in elastic modulus between the adhesion rubber layer and the compression rubber layer.

It is also known that stacking a back portion of a belt, which is made of a rubber composition, on the outer side of an adhesion rubber layer increases the power transmission capability of the back portion of the belt.

Patent Document 2 discloses that monofilaments having a flat transverse section are embedded in a backing rubber layer of a V-ribbed belt. Patent Document 2 describes that embedding the monofilaments in the backing rubber layer can prevent occurrence of vertical splits in ribbed rubber in grooves of V-shaped ribs.

CITATION LIST

Patent Document

PATENT DOCUMENT 1: Japanese Patent Publication No. H10-103413
PATENT DOCUMENT 2: Japanese Patent Publication No. H07-269658

SUMMARY OF THE INVENTION

Technical Problem

In friction drive belts having their back faces covered with a backing rubber layer, an adhesion rubber layer and the backing rubber layer have different elastic moduli. Thus, stress is intensively applied to a specific part of the interface between the adhesion rubber layer and the backing rubber layer when the belt is subjected to a tensile or bending force. This can cause cracks in the backing rubber layer of the belt, or delamination (separation) between a core wire and the adhesion rubber layer.

One conventionally known solution to such problems is to adjust the elastic modulus of the backing rubber layer of the belt by containing, as appropriate, short fibers in the backing rubber layer, thereby reducing the difference in elastic modulus between a rubber composition forming the adhesion rubber layer and a rubber composition forming the backing rubber layer.

In the above method in which the short fibers are contained in the backing rubber layer, a joint portion is provided in a backing rubber sheet in order to align the short fibers in one direction. The thickness of the backing rubber layer is not uniform in the vicinity of the joint portion, and concaves and convexes are present at the surface of the backing rubber layer. Thus, when the belt is driven with its back face being in contact with pulleys, abnormal noise is generated at the stepped portion of the joint portion. Moreover, load is intensively applied to the joint portion, thereby causing delamination of the backing rubber layer. Furthermore, due to the thin thickness of the backing rubber layer, the short fibers are not sufficiently dispersed, thereby reducing durability of the belt.

It is an object of the present invention to provide a friction drive belt having its back face covered with a backing rubber layer, in which cracks and separation are less likely to appear even when the belt is subjected to a tensile or bending force, and thus which has high durability.

Solution to the Problem

A friction drive belt of the present invention that achieves the above object includes: an adhesion rubber layer having a core wire embedded therein so as to form a helical pattern having a pitch in a lateral direction of the belt; a compression rubber layer provided on a surface of the adhesion rubber layer located on an inner side of the belt, and serving as a portion that is to contact pulleys, and a backing rubber layer provided on a surface of the adhesion rubber layer located on an outer side of the belt, and serving as a back portion of the belt, wherein a ratio of tensile stress at 10% elongation of a rubber composition forming the adhesion rubber layer to that of a rubber composition forming the backing rubber layer is 1.77 or more, as measured in a longitudinal direction of the belt at an ambient temperature of 25° C. according to JIS K 6251.

In the friction drive belt of the present invention, the backing rubber layer may have a thickness of 0.3-0.5 mm.

In the friction drive belt of the present invention, the backing rubber layer may contain no short fibers.

Advantages of the Invention

According to the present invention, the ratio of tensile stress at 10% elongation of the rubber composition forming the adhesion rubber layer to that of the rubber composition forming the backing rubber layer is 1.77 or more, as measured at an ambient temperature of 25° C. This can effectively reduce occurrence of cracks and separation due to concentration of stress on a specific part of the interface between the adhesion rubber layer and the backing rubber layer, whereby high durability can be obtained.

DESCRIPTION OF EMBODIMENTS

An embodiment will be described below with reference to the accompanying drawings.

Figure 1:
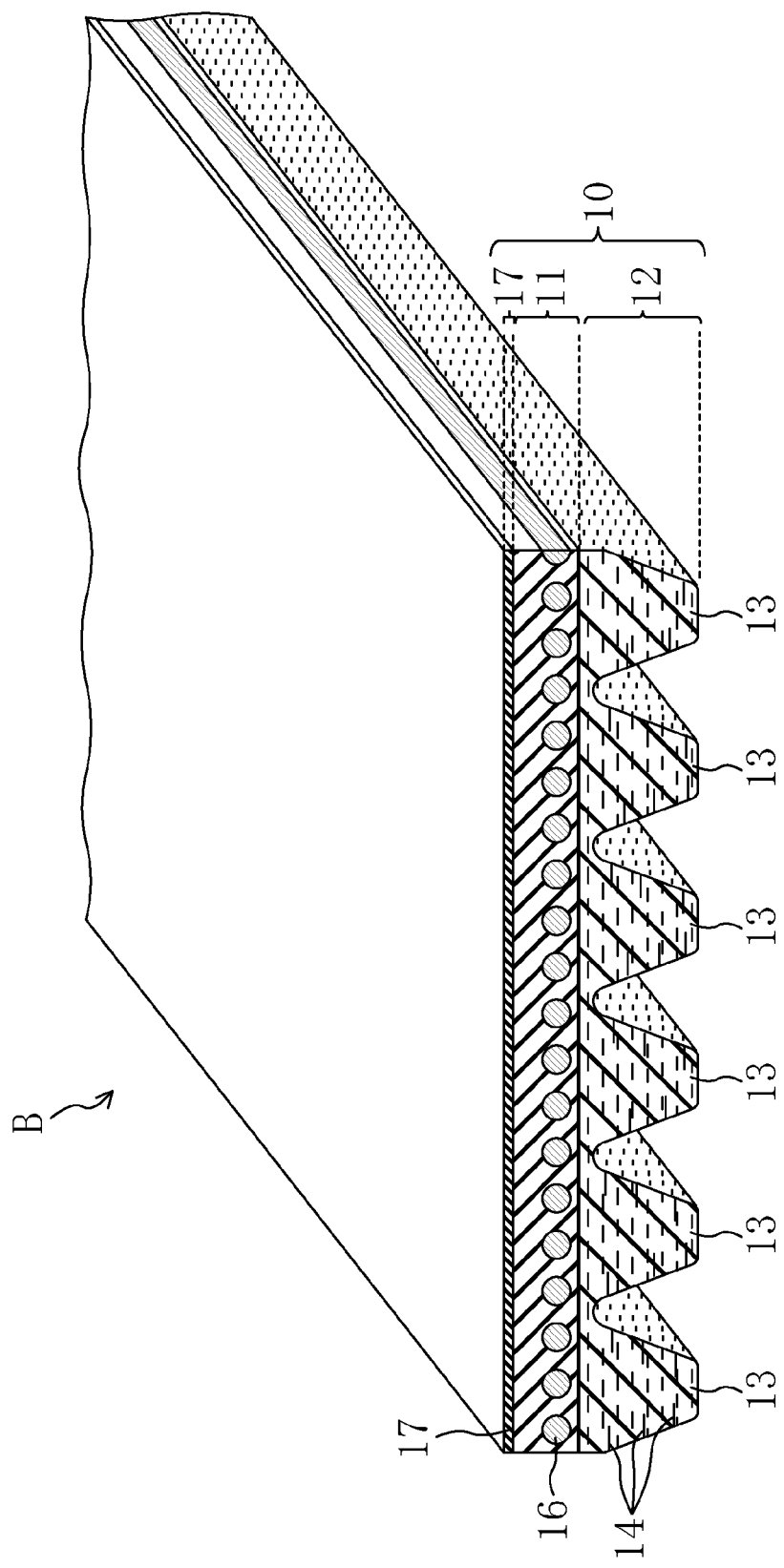
FIG. 1 is a perspective view of a V-ribbed belt according to an embodiment.

FIG. 1 shows a V-ribbed belt B according to the present embodiment. This V-ribbed belt B is used for, e.g., accessory drive belt transmission systems in engine compartments of automobiles, and has a circumference of 700-3,000 mm, a width of 10-30 mm, and a length of 4.0-5.0 mm.

The V-ribbed belt B includes a V-ribbed belt body 10 having a three-layer configuration of an adhesion rubber layer 11 in an intermediate portion of the belt, a compression rubber layer 12 on the inner side of the belt, and a backing rubber layer 17 on the outer side of the belt. A core wire 16 is embedded in the adhesion rubber layer 11 so as to form a helical pattern having a pitch in the lateral direction of the belt.

The adhesion rubber layer 11 is formed in a band shape having a rectangular cross section that is longer in the horizontal direction than in the vertical direction, and has a thickness of, e.g., 1.0-2.5 mm. The adhesion rubber layer 11 is made of a rubber composition produced by mixing a raw rubber component with various compounding agents. Examples of the raw rubber component of the rubber composition that forms the adhesion rubber layer 11 include ethylene-α-olefin elastomers such as ethylene-propylene rubber (EPR) and ethylene propylene diene monomer rubber (EPDM), chloroprene rubber (CR), chlorosulfonated polyethylene rubber (CSM), hydrogenated acrylonitrile rubber (H-NBR), etc. Of these examples, the ethylene-α-olefin elastomers are preferable in consideration of the environment, and in terms of capabilities such as abrasion resistance and crack resistance. Examples of the compounding agents include a crosslinker (e.g., sulfur and organic peroxides), an antioxidant, a processing aid, a plasticizer, a reinforcer such as carbon black, a filler, etc. Note that the rubber composition that forms the adhesion rubber layer 11 is produced by kneading a mixture of the raw rubber component and the compounding agents to form an uncrosslinked rubber composition, heating and pressing the uncrosslinked rubber composition, and crosslinking the uncrosslinked rubber composition by the crosslinker.

The compression rubber layer 12 is provided on a surface of the adhesion rubber layer 11 located on the inner side of the belt, and has a plurality of V-shaped ribs 13 that are tapered toward the inner side of the belt. The compression rubber layer 12 forms a portion that is to contact pulleys. Each of the plurality of V-shaped ribs 13 is formed in a ridge shape having a substantially triangular cross section and extending in the longitudinal direction of the belt, and the plurality of V-shaped ribs 13 are arranged parallel to each other in the lateral direction of the belt. Each of the V-shaped ribs 13 has, e.g., a height of 2.0-3.0 mm, and a width of 1.0-3.6 mm at its base end. The number of ribs is, e.g., 3-6 (6 ribs in FIG. 1).

The compression rubber layer 12 is made of a rubber composition produced by mixing a raw rubber component with various compounding agents. Examples of the raw rubber component of the rubber composition that forms the compression rubber layer 12 include ethylene-α-olefin elastomers such as ethylene-propylene rubber (EPR) and ethylene propylene diene monomer rubber (EPDM), chloroprene rubber (CR), chlorosulfonated polyethylene rubber (CSM), hydrogenated acrylonitrile rubber (H-NBR), etc. Of these examples, the ethylene-α-olefin elastomers are preferable in consideration of the environment, and in terms of capabilities such as abrasion resistance and crack resistance. In the case where the raw rubber component is the ethylene-α-olefin elastomer, the coefficient of friction, abrasion resistance, and adhesion wear resistance can be adjusted by using an ethylene-α-olefin elastomer having high ethylene crystallinity or an ethylene-α-olefin elastomer containing both crystalline polymers and noncrystalline polymers. Examples of the compounding agents include a crosslinker (e.g., sulfur and organic peroxides), an antioxidant, a processing aid, a plasticizer, a reinforcer such as carbon black, short fibers 14, etc. Note that the rubber composition that forms the compression rubber layer 12 is produced by kneading a mixture of the raw rubber component and the compounding agents to form an uncrosslinked rubber composition, heating and pressing the uncrosslinked rubber composition, and crosslinking the uncrosslinked rubber composition by the crosslinker.

The rubber composition that forms the compression rubber layer 12 contains the short fibers 14. The short fibers 14 are provided so as to be aligned in the lateral direction of the belt. Some of the short fibers 14 are dispersed and exposed at the surface of the portion that is to contact the pulleys, namely at the surfaces of the V-shaped ribs 13. Those short fibers 14 which are dispersed and exposed at the surfaces of the V-shaped ribs 13 may stick out of the surfaces of the V-shaped ribs 13.

The short fibers 14 are manufactured by, e.g., subjecting long fibers to an adhesion treatment of heating the long fibers after soaking them in a resorcinol formaldehyde latex aqueous solution (hereinafter referred to as the "RFL aqueous solution"), etc., and cutting the long fibers along the longitudinal direction into pieces having a predetermined width. The short fibers 14 have a length of, e.g., 0.2-5.0 mm. The short fibers 14 have a diameter of, e.g., 10-50 μm. The rubber composition contains 50 parts by mass or less of the short fibers 14 per 100 parts by mass of the rubber component.

The adhesion rubber layer 11 and the compression rubber layer 12 may be made of either different rubber compositions or exactly the same rubber composition.

The backing rubber layer 17 is formed in a sheet shape, is provided on a surface of the adhesion rubber layer 11 located on the outer side of the belt, and forms a back portion of the belt. The backing rubber layer 17 has a thickness of, e.g., 0.3-0.8 mm, and more preferably 0.3-0.5 mm. The backing rubber layer 17 is made of a rubber composition produced by mixing a raw rubber component with various compounding agents. Examples of the raw rubber component of the rubber composition that forms the backing rubber layer 17 include ethylene-α-olefin elastomers such as ethylene-propylene rubber (EPR) and ethylene propylene diene monomer rubber (EPDM), chloroprene rubber (CR), chlorosulfonated polyethylene rubber (CSM), hydrogenated acrylonitrile rubber (H-NBR), etc. Of these examples, the ethylene-α-olefin elastomers are preferable in consideration of the environment, and in terms of capabilities such as abrasion resistance, crack resistance, and adhesion wear resistance. Examples of the compounding agents include a crosslinker (e.g., sulfur and organic peroxides), an antioxidant, a processing aid, a plasticizer, a reinforcer such as carbon black, a filler, etc. The rubber composition that forms the backing rubber layer 17 may either contain the short fibers 14 like the rubber composition that forms the compression rubber layer 17, or may not contain such short fibers 14. However, the latter is preferable in order to reduce occurrence of cracks and separation. Note that the rubber composition that forms the backing rubber layer 17 is produced by kneading a mixture of the raw rubber component and the compounding agents to form an uncrosslinked rubber composition, heating and pressing the uncrosslinked rubber composition, and crosslinking the uncrosslinked rubber composition by the crosslinker.

The rubber composition that forms the adhesion rubber layer 11 has a higher elastic modulus in the longitudinal direction of the belt than the rubber composition that forms the backing rubber layer 17. Moreover, the ratio of tensile stress at 10% elongation of the rubber composition forming the adhesion rubber layer 11 to that of the rubber composition forming the backing rubber layer 17 is 1.77 or more, as measured in the longitudinal direction of the belt at an ambient temperature of 25° C. according to Japanese Industrial Standards JIS K 6251.

Tensile stress "$M_{10}$" (MPa) at 10% elongation as measured at an ambient temperature of 25° C. according to JIS K 6251 is defined by "$M_{10}=F_{10}/A$," where "$F_{10}$" (M) represents a tensile force at 10% elongation, and "A" (mm$^2$) represents a cross-sectional area of a test piece before elongation.

The core wire 16 is formed by twisted yarns 16' such as polyester fibers (PET), polyethylene naphthalate fibers (PEN), aramid fibers, or vinylon fibers. In order to provide the core wire 16 with an adhesion property to the V-ribbed belt body 10, the core wire 16 has been subjected to an adhesion treatment of heating the core wire after soaking it in an RFL aqueous solution and/or an adhesion treatment of drying the core wire after soaking it in rubber cement, before a forming process.

Figure 2A:
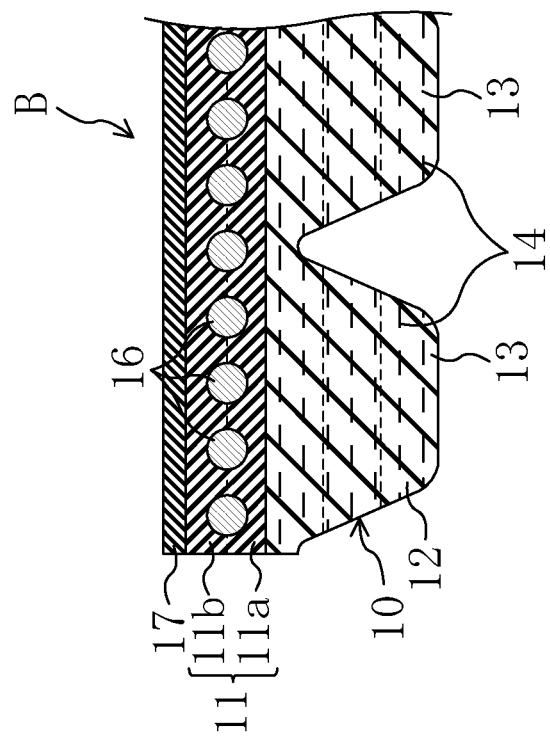
FIGS. 2A and 2B are diagrams illustrating a manufacturing method of the V-ribbed belt.
Figure 2B:
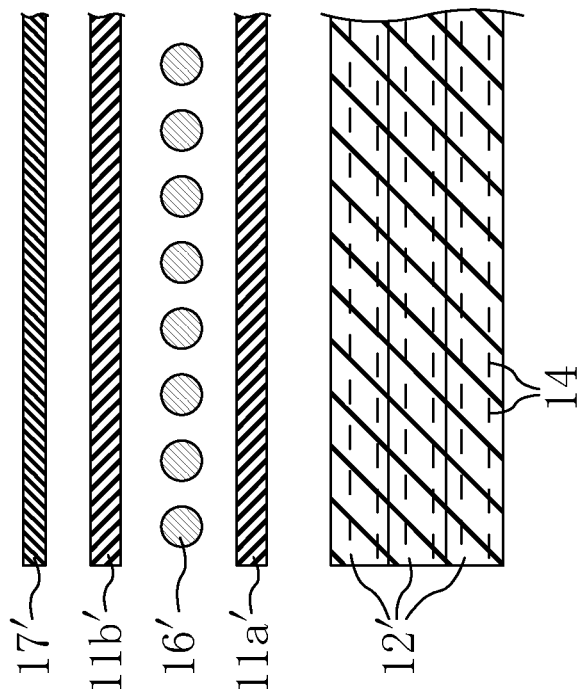

A manufacturing method of the V-ribbed belt B will be described below with reference to FIGS. 2A-2B.

An inner mold and a rubber sleeve are used in manufacturing of the V-ribbed belt B. The inner mold has, on its outer periphery, a forming surface for forming the back face of the belt into a predetermined shape, and the rubber sleeve has, on its inner periphery, a forming surface for forming the inner side of the belt into a predetermined shape.

First, an uncrosslinked rubber sheet 17' for forming the backing rubber layer 17 is wrapped around the inner mold, and then an uncrosslinked rubber sheet 11b' for forming an outer part 11b of the adhesion rubber layer 11 is wrapped around the uncrosslinked rubber sheet 17'.

Next, the twisted yarns 16' to be used as the core wire 16 are helically wound around the uncrosslinked rubber sheet 11b', and an uncrosslinked rubber sheet 11a' for forming an inner part 11a of the adhesion rubber layer 11 is wrapped therearound. An uncrosslinked rubber sheet 12' for forming the compression rubber layer 12 is also wrapped around the uncrosslinked rubber sheet 11a'.

Then, the rubber sleeve is placed over the molding article on the inner mold, and the rubber sleeve and the inner mold are placed in a molding furnace to heat the inner mold with high temperature water vapor, etc. and to press the rubber sleeve radially inward with a high pressure. At this time, the raw rubber components flow, and a crosslinking reaction proceeds. At the same time, an adhesion reaction of the twisted yarns 16' to rubber also proceeds. A cylindrical belt slab (a belt body precursor) is formed in this manner.

The belt slab is removed from the inner mold, and is divided into several pieces in the longitudinal direction. Then, the outer periphery of each piece is ground and cut with a grinding stone to form the V-shaped ribs 13, namely the portion that is to contact the pulleys. At this time, those short fibers 14 which are exposed at the surface of the portion that is to contact the pulleys may stick out of the surface of the portion that is to contact the pulleys, namely the surfaces of the V-shaped ribs 13.

Finally, each of the divided belt slab pieces having the V-shaped ribs 13 formed on their outer peripheries is cut into rings having a predetermined width, and each ring is reversed, whereby the V-ribbed belt B is obtained.

An accessory drive belt transmission system 30 using the V-ribbed belt B and provided in an engine compartment of an automobile will be described below.

Figure 3:
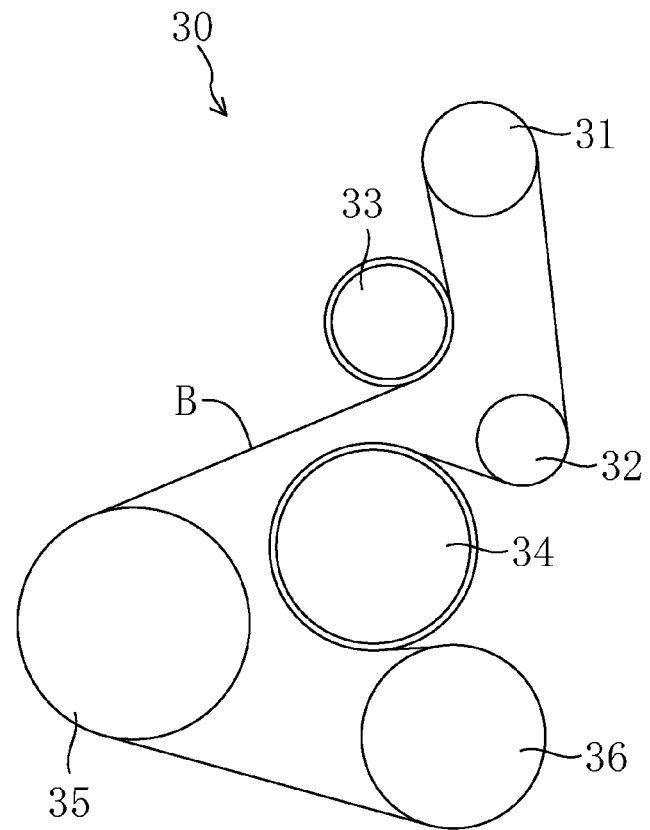
FIG. 3 is a diagram showing a layout of pulleys of an accessory drive belt transmission system.

FIG. 3 shows a layout of pulleys of the accessory drive belt transmission system 30. This accessory drive belt transmission system 30 is of a serpentine drive type in which the V-ribbed belt B is wrapped around 6 pulleys, namely 4 ribbed pulleys and 2 flat pulleys.

The layout of the accessory drive belt transmission system 30 includes a power steering pulley 31 located at an uppermost position, an alternating-current (AC) generator pulley 32 placed below the power steering pulley 31, a flat tensioner pulley 33 placed on the lower left side of the power steering pulley 31, a flat water pump pulley 34 placed below the tensioner pulley 33, a crankshaft pulley 35 placed on the lower left side of the tensioner pulley 33, and an air conditioner pulley 36 placed on the lower right side of the crankshaft pulley 35. All the pulleys except the flat tensioner pulley 33 and the flat water pump pulley 34 are ribbed pulleys. The V-ribbed belt B is sequentially wrapped around the power steering pulley 31 with the V-shaped ribs 13 being in contact therewith, the tensioner pulley 33 with the back face of the belt being in contact therewith, and the crankshaft pulley 35 and the air conditioner pulley 36 with the V-shaped ribs 13 being in contact therewith. The V-ribbed belt B is further wrapped around the water pump pulley 34 with the back face of the belt being in contact therewith, and the AC generator pulley 32 with the V-shaped ribs 13 being in contact therewith, and returns to the power steering pulley 31.

According to the V-ribbed belt B having the above configuration, the ratio of tensile stress at 10% elongation of the rubber composition forming the adhesion rubber layer 11 to that of the rubber composition forming the backing rubber layer 17 is 1.77 or more, as measured at an ambient temperature of 25° C. This can effectively reduce occurrence of cracks and separation due to concentration of stress on a specific part of the interface between the adhesion rubber layer 11 and the backing rubber layer 17, whereby high durability can be obtained.

Although the V-ribbed belt B is described in the present embodiment, the present invention is not particularly limited to this. The present invention is also applicable to, e.g., other raw edge V-belts.

[Test Evaluation 1]

A test evaluation performed on V-ribbed belts will be described below.

The following test evaluation 1 was performed on the V-ribbed belts in order to analyze the relation of the elastic modulus in the longitudinal direction of the belt between the adhesion rubber layer and the backing rubber layer, and the relation between the ratio of tensile stress at 10% elongation of the rubber composition forming the adhesion rubber layer to that of the rubber composition forming the backing rubber layer as measured at an ambient temperature of 25° C., and durability of the belt.

(Configuration of Adhesion Rubber Composition)

As adhesion rubbers <1> and <2>, the following two kinds of adhesion rubber compositions were prepared by kneading. Their specific configurations are also shown in Table 1.

Adhesion Rubber <1>

As the adhesion rubber <1>, an uncrosslinked rubber composition was produced by mixing 100 parts by mass of EPDM (1) (ethylene propylene diene monomer rubber) (made by JSR Corporation, trade name: JSR EP33) with 60 parts by mass of carbon black FEF (made by Tokai Carbon Co., Ltd., trade name: SEAST SO), 30 parts by mass of silica (made by Tokuyama Corporation, trade name: TOKUSIL GU), 10 parts by mass of paraffinic oil (made by Japan Sun Oil Company, Ltd., trade name: SUMPAR 2280), 1.5 parts by mass of sulfur (made by NIPPON KANRYU INDUSTRY CO., LTD., trade name: Seimi Sulfur), 2 parts by mass of a crosslinking accelerator (made by Ouchi Shinko Chemical Industrial Co., Ltd., trade name: NOCCELER-EP-50), 1 part by mass of stearic acid (made by New Japan Chemical Co., Ltd., trade name: Stearic Acid 50S), 5 parts by mass of zinc oxide (made by Sakai Chemical Industry Co., Ltd., trade name: Aenka #3), 5 parts by mass of a tackifier (made by ZEON CORPORATION, trade name: Quintone A100), 2 parts by mass of an antioxidant (1) (made by Ouchi Shinko Chemical Industrial Co., Ltd., trade name: NOCRAC 224), and 1 part by mass of an antioxidant (2) (made by Ouchi Shinko Chemical Industrial Co., Ltd., trade name: NOCRAC MB), and kneading the mixture.

The adhesion rubber <1> was rolled into a sheet having a thickness of 2.2 mm by a calendering process, and the rubber sheet was crosslinked at 170° C. for 20 minutes to form a crosslinked rubber sheet. Dumbbell shaped test pieces-3 were punched out from the crosslinked rubber sheet so that the grain direction of the calendering process corresponds to the longitudinal direction, namely the tension direction, and a tensile test was conducted at an ambient temperature of 25° C. according to JIS K 6251. Tensile stress at 10% elongation was 2.25 MPa.

Adhesion Rubber <2>

As the adhesion rubber <2>, an uncrosslinked rubber composition was produced by mixing 100 parts by mass of EPDM (1) with 65 parts by mass of carbon black FEF, 21 parts by mass of silica, 15 parts by mass of paraffinic oil, 1.5 parts by mass of sulfur, 2 parts by mass of a crosslinking accelerator, 1 part by mass of stearic acid, 5 parts by mass of zinc oxide, 5 parts by mass of a tackifier, 2 parts by mass of an antioxidant (1), and 1 part by mass of an antioxidant (2), and kneading the mixture.

Tensile stress at 10% elongation was 1.61 MPa as measured in a manner similar to that of the adhesion rubber <1>.

TABLE 1

|  | Adhesion Rubber | |
| --- | --- | --- |
|  | <1> | <2> |
| EPDM (1) | 100 | 100 |
| Carbon Black FEF | 60 | 65 |
| Silica | 30 | 21 |
| Paraffinic Oil | 10 | 15 |
| Sulfur | 1.5 | 1.5 |
| Crosslinking Accelerator | 2 | 2 |
| Stearic Acid | 1 | 1 |
| Zinc Oxide | 5 | 5 |
| Tackifier | 5 | 5 |
| Antioxidant (1) | 2 | 2 |
| Antioxidant (2) | 1 | 1 |
| Tensile Stress at 10% Elongation (MPa) | 2.25 | 1.61 |

(Configuration of Backing Rubber Composition)

As backing rubbers <1> to <10>, the following ten kinds of backing rubber compositions were prepared by kneading. Their specific configurations are also shown in Table 2.

Backing Rubber <1>

As the backing rubber <1>, an uncrosslinked rubber composition was produced by mixing 100 parts by mass of EPDM (2) (made by JSR Corporation, trade name: EP24) with 80 parts by mass of carbon black FEF, 1.5 parts by mass of sulfur, 4 parts by mass of a crosslinking accelerator, 1 part by mass of stearic acid, and 5 parts by mass of zinc oxide, and kneading the mixture.

The backing rubber <1> was rolled into a sheet having a thickness of 2.2 mm by a calendering process, and was crosslinked at 170° C. for 20 minutes to form a crosslinked rubber sheet. Dumbbell shaped test pieces-3 were punched out from the crosslinked rubber sheet so that the grain direction of the calendering process corresponds to the longitudinal direction, namely the tensile direction, and a tensile test was conducted at an ambient temperature of 25° C. according to JIS K 6251. Tensile stress at 10% elongation was 1.27 MPa.

Backing Rubber <2>

As the backing rubber <2>, an uncrosslinked rubber composition was produced with the same configuration as the backing rubber <1> except that the amount of carbon black FEF was 85 parts by mass, and that 8 parts by mass of paraffinic oil was further mixed.

Tensile stress at 10% elongation was 1.11 MPa as measured in a manner similar to that of the backing rubber <1>.

Backing Rubber <3>

As the backing rubber <3>, an uncrosslinked rubber composition was produced with the same configuration as the backing rubber <1> except that the amount of carbon black FEF was 70 parts by mass.

Tensile stress at 10% elongation was 1.06 MPa as measured in a manner similar to that of the backing rubber <1>.

Backing Rubber <4>

As the backing rubber <4>, an uncrosslinked rubber composition was produced with the same configuration as the backing rubber <3> except that 4 parts by mass of paraffinic oil was further mixed.

Tensile stress at 10% elongation was 0.90 MPa as measured in a manner similar to that of the backing rubber <1>.

Backing Rubber <5>

As the backing rubber <5>, an uncrosslinked rubber composition was produced by mixing 100 parts by mass of EPDM (3) (made by The Dow Chemical Company, trade name: Nordel 4640) with 65 parts by mass of carbon black FEF, 8 parts by mass of paraffinic oil, 1.5 parts by mass of sulfur, 4 parts by mass of a crosslinking accelerator, 1 part by mass of stearic acid, and 5 parts by mass of zinc oxide, and kneading the mixture.

Tensile stress at 10% elongation was 0.81 MPa as measured in a manner similar to that of the backing rubber <1>.

Backing Rubber <6>

As the backing rubber <6>, an uncrosslinked rubber composition was produced by mixing 100 parts by mass of EPDM (4) (made by JSR Corporation, trade name: EP21) with 80 parts by mass of carbon black FEF, 4 parts by mass of paraffinic oil, 1.5 parts by mass of sulfur, 4 parts by mass of a crosslinking accelerator, 1 part by mass of stearic acid, and 5 parts by mass of zinc oxide, and kneading the mixture.

Tensile stress at 10% elongation was 1.76 MPa as measured in a manner similar to that of the backing rubber <1>.

Backing Rubber <7>

As the backing rubber <7>, an uncrosslinked rubber composition was produced with the same configuration as the backing rubber <5> except that the amount of carbon black FEF was 85 parts by mass.

Tensile stress at 10% elongation was 1.08 MPa as measured in a manner similar to that of the backing rubber <1>.

Backing Rubber <8>

As the backing rubber <8>, an uncrosslinked rubber composition was produced with the same configuration as the backing rubber <2> except that the amount of paraffinic oil was 4 parts by mass.

Tensile stress at 10% elongation was 1.21 MPa as measured in a manner similar to that of the backing rubber <1>.

Backing Rubber <9>

As the backing rubber <9>, an uncrosslinked rubber composition was produced with the same configuration as the backing rubber <5> except that the amount of carbon black FEF was 75 parts by mass.

Tensile stress at 10% elongation was 1.03 MPa as measured in a manner similar to that of the backing rubber <1>.

Backing Rubber <10>

As the backing rubber <10>, an uncrosslinked rubber composition was produced with the same configuration as the backing rubber <1> except that the amount of carbon black FEF was 85 parts by mass.

Tensile stress at 10% elongation was 1.30 MPa as measured in a manner similar to that of the backing rubber <1>.

TABLE 2

| | Backing Rubber | | | | | | | | | |
|---|---|---|---|---|---|---|---|---|---|---|
| | <1> | <2> | <3> | <4> | <5> | <6> | <7> | <8> | <9> | <10> |
| EPDM(2) | 100 | 100 | 100 | 100 | | | | 100 | | 100 |
| EPDM(3) | | | | | 100 | | 100 | | 100 | |
| EPDM(4) | | | | | | 100 | | | | |
| Carbon Black FEF | 80 | 85 | 70 | 70 | 65 | 80 | 85 | 85 | 75 | 85 |
| Paraffinic Oil | | 8 | | 4 | 8 | 4 | 8 | 4 | 8 | |
| Sulfur | 1.5 | 1.5 | 1.5 | 1.5 | 1.5 | 1.5 | 1.5 | 1.5 | 1.5 | 1.5 |
| Crosslinking Accelerator | 4 | 4 | 4 | 4 | 4 | 4 | 4 | 4 | 4 | 4 |
| Stearic Acid | 1 | 1 | 1 | 1 | 1 | 1 | 1 | 1 | 1 | 1 |
| Zinc Oxide | 5 | 5 | 5 | 5 | 5 | 5 | 5 | 5 | 5 | 5 |
| Tensile Stress at 10% Elongation (MPa) | 1.27 | 1.11 | 1.06 | 0.9 | 0.81 | 1.76 | 1.08 | 1.21 | 1.03 | 1.3 |

(Belts for Test Evaluation 1)

The following belts for test evaluation were fabricated as Examples 1-5 and Comparative Examples 1-7.

Example 1

As Example 1, a V-ribbed belt was fabricated in which an adhesion rubber layer was made of the adhesion rubber <1>, and a backing rubber layer was made of the backing rubber <1>.

In Example 1, the ratio of tensile stress at 10% elongation of the rubber composition forming the adhesion rubber layer to that of the rubber composition forming the backing rubber layer was 1.77.

Note that the compression rubber layer 12 was formed by a rubber composition of EPDM reinforced by dispersing nylon short fibers therein, the core wire was formed by twisted yarns of polyethylene terephthalate fibers (PET), the belt had a circumference of 1,210 mm, a width of 10.68 mm, and a thickness of 4.3 mm, and the number of ribs was 3. The backing rubber layer had a thickness of 0.5 mm.

Example 2

As Example 2, a V-ribbed belt was fabricated with the same configuration as Example 1 except that the adhesion rubber layer was made of the adhesion rubber <1>, and that the backing rubber layer was made of the backing rubber <2>.

In Example 2, the ratio of tensile stress at 10% elongation of the rubber composition forming the adhesion rubber layer to that of the rubber composition forming the backing rubber layer was 2.03.

Example 3

As Example 3, a V-ribbed belt was fabricated with the same configuration as Example 1 except that the adhesion rubber layer was made of the adhesion rubber <1>, and that the backing rubber layer was made of the backing rubber <3>.

In Example 3, the ratio of tensile stress at 10% elongation of the rubber composition forming the adhesion rubber layer to that of the rubber composition forming the backing rubber layer was 2.12.

Example 4

As Example 4, a V-ribbed belt was fabricated with the same configuration as Example 1 except that the adhesion rubber layer was made of the adhesion rubber <2>, and that the backing rubber layer was made of the backing rubber <4>.

In Example 4, the ratio of tensile stress at 10% elongation of the rubber composition forming the adhesion rubber layer to that of the rubber composition forming the backing rubber layer was 1.79.

Example 5

As Example 5, a V-ribbed belt was fabricated with the same configuration as Example 1 except that the adhesion rubber layer was made of the adhesion rubber <2>, and that the backing rubber layer was made of the backing rubber <5>.

In Example 5, the ratio of tensile stress at 10% elongation of the rubber composition forming the adhesion rubber layer to that of the rubber composition forming the backing rubber layer was 1.99.

Comparative Example 1

As Comparative Example 1, a V-ribbed belt was fabricated with the same configuration as Example 1 except that the adhesion rubber layer was made of the adhesion rubber <2>, and that the backing rubber layer was made of the backing rubber <3>.

In Comparative Example 1, the ratio of tensile stress at 10% elongation of the rubber composition forming the adhesion rubber layer to that of the rubber composition forming the backing rubber layer was 1.52.

Comparative Example 2

As Comparative Example 2, a V-ribbed belt was fabricated with the same configuration as Example 1 except that the adhesion rubber layer was made of the adhesion rubber <2>, and that the backing rubber layer was made of the backing rubber <6>.

In Comparative Example 2, the ratio of tensile stress at 10% elongation of the rubber composition forming the adhesion rubber layer to that of the rubber composition forming the backing rubber layer was 0.91.

Comparative Example 3

As Comparative Example 3, a V-ribbed belt was fabricated with the same configuration as Example 1 except that the adhesion rubber layer was made of the adhesion rubber <2>, and that the backing rubber layer was made of the backing rubber <7>.

In Comparative Example 3, the ratio of tensile stress at 10% elongation of the rubber composition forming the adhesion rubber layer to that of the rubber composition forming the backing rubber layer was 1.49.

Comparative Example 4

As Comparative Example 4, a V-ribbed belt was fabricated with the same configuration as Example 1 except that the adhesion rubber layer was made of the adhesion rubber <2>, and that the backing rubber layer was made of the backing rubber <8>.

In Comparative Example 4, the ratio of tensile stress at 10% elongation of the rubber composition forming the adhesion rubber layer to that of the rubber composition forming the backing rubber layer was 1.33.

Comparative Example 5

As Comparative Example 5, a V-ribbed belt was fabricated with the same configuration as Example 1 except that the adhesion rubber layer was made of the adhesion rubber <2>, and that the backing rubber layer was made of the backing rubber <9>.

In Comparative Example 5, the ratio of tensile stress at 10% elongation of the rubber composition forming the adhesion rubber layer to that of the rubber composition forming the backing rubber layer was 1.56.

Comparative Example 6

As Comparative Example 6, a V-ribbed belt was fabricated with the same configuration as Example 1 except that the adhesion rubber layer was made of the adhesion rubber <1>, and that the backing rubber layer was made of the backing rubber <10>.

In Comparative Example 6, the ratio of tensile stress at 10% elongation of the rubber composition forming the adhesion rubber layer to that of the rubber composition forming the backing rubber layer was 1.73.

Comparative Example 7

As Comparative Example 7, a V-ribbed belt was fabricated with the same configuration as Example 1 except that the adhesion rubber layer was made of the adhesion rubber <1>, and that the backing rubber layer was made of the backing rubber <6>.

In Comparative Example 7, the ratio of tensile stress at 10% elongation of the rubber composition forming the adhesion rubber layer to that of the rubber composition forming the backing rubber layer was 1.28.

(Test Evaluation Method)

Figure 4:
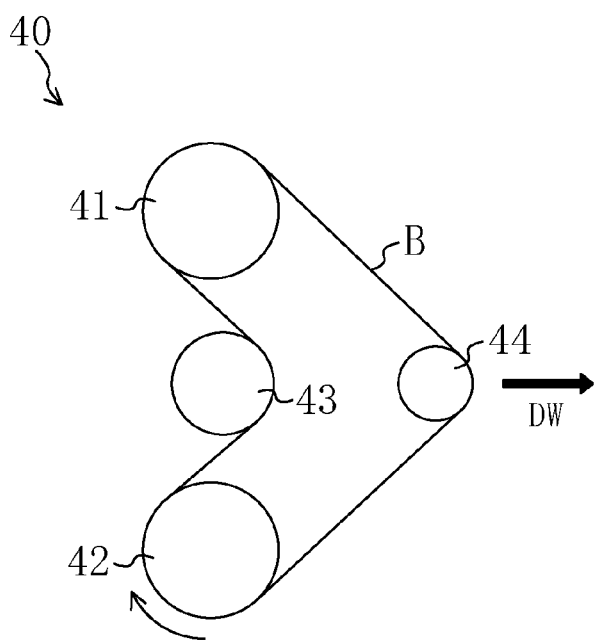
FIG. 4 is a diagram showing a layout of pulleys of a belt running tester in test evaluation 1.

FIG. 4 shows a layout of pulleys of a belt running tester 40 used in the test evaluation 1.

The belt running tester 40 is formed by: upper and lower large-diameter ribbed pulleys (the upper pulley is a driven pulley, and the lower pulley is a driving pulley) 41, 42 having a diameter of 120 mm; an idler pulley 43 having a diameter of 85 mm and placed on the left side of the large-diameter ribbed pulleys 41, 42 at an intermediate position in the vertical direction between the large-diameter ribbed pulleys 41, 42; and a small-diameter ribbed pulley 44 having a diameter of 55 mm and placed on the right side of the large-diameter ribbed pulleys 41, 42 at an intermediate position in the vertical direction between the large-diameter ribbed pulleys 41, 42. The small-diameter ribbed pulley 44 is positioned on the inner side of the belt so that the contact angle of the belt is 90 degrees.

Each of the V-ribbed belts of Examples 1-5 and Comparative Examples 1-7 was wrapped around the three ribbed pulleys 41, 42, 44 and the idler pulley 43. Then, the small-diameter ribbed pulley 44 was pulled laterally so that dead load of 559 N was applied thereto, and the lower ribbed pulley 42 as the driving pulley was rotated clockwise at a rotational speed of 4,900 rpm at an ambient temperature of 120° C. The time until cracks or separation appeared in the belt was measured as "endurance running time" of the belt (Test Evaluation Result)

Table 3 shows the result of the test evaluation 1.

TABLE 3

| | Examples | | | | | Comparative Example |
|---|---|---|---|---|---|---|
| | 1 | 2 | 3 | 4 | 5 | 1 |
| Adhesion Rubber Layer | Adhesion Rubber <1> | Adhesion Rubber <1> | Adhesion Rubber <1> | Adhesion Rubber <2> | Adhesion Rubber <2> | Adhesion Rubber <2> |
| Backing Rubber Layer | Backing Rubber <1> | Backing Rubber <2> | Backing Rubber <3> | Backing Rubber <4> | Backing Rubber <5> | Backing Rubber <3> |
| Ratio of Tensile Stress at 10% Elongation: Adhesion Rubber $M_{10}$/ Backing Rubber $M_{10}$ | 1.77 | 2.03 | 2.12 | 1.79 | 1.99 | 1.52 |
| Endurance Running Time (h) | 335 | 320 | 325 | 280 | 260 | 5 |

TABLE 3-continued

|  | Comparative Examples | | | | | |
| --- | --- | --- | --- | --- | --- | --- |
|  | 2 | 3 | 4 | 5 | 6 | 7 |
| Adhesion Rubber Layer | Adhesion Rubber <2> | Adhesion Rubber <2> | Adhesion Rubber <2> | Adhesion Rubber <2> | Adhesion Rubber <1> | Adhesion Rubber <1> |
| Backing Rubber Layer | Backing Rubber <6> | Backing Rubber <7> | Backing Rubber <8> | Backing Rubber <9> | Backing Rubber <10> | Backing Rubber <6> |
| Ratio of Tensile Stress at 10% Elongation: Adhesion Rubber $M_{10}$/ Backing Rubber $M_{10}$ | 0.91 | 1.49 | 1.33 | 1.56 | 1.73 | 1.28 |
| Endurance Running Time (h) | 75 | 70 | 95 | 125 | 125 | 80 |

Table 3 shows that in Examples 1-5 in which the ratio of tensile stress at 10% elongation of the rubber composition forming the adhesion rubber layer to that of the rubber composition forming the backing rubber layer is 1.77 or more, the time until cracks or separation appeared is significantly longer than that in Comparative examples 1-7 in which the ratio is less than 1.77.

[Test Evaluation 2]

The following test evaluation 2 was performed in order to analyze the relation between the thickness of the backing rubber layer of the V-ribbed belt and endurance of the belt.

(Belts for Test Evaluation 2)

The following belts for test evaluation were fabricated as Examples 6-11.

Example 6

As Example 6, a V-ribbed belt was fabricated in which the adhesion rubber layer was made of the adhesion rubber <1>, and the backing rubber layer having a thickness of 0.3 mm was made of the backing rubber <1>.

In Example 6, the ratio of tensile stress at 10% elongation of the rubber composition forming the adhesion rubber layer to that of the rubber composition forming the backing rubber layer was 1.77.

The configuration is otherwise the same as Example 1.

Example 7

As Example 7, a V-ribbed belt was fabricated with the same configuration as Example 6 except that the backing rubber layer had a thickness of 0.4 mm.

Example 8

As Example 8, a V-ribbed belt was fabricated with the same configuration as Example 6 except that the backing rubber layer had a thickness of 0.5 mm.

Example 9

As Example 9, a V-ribbed belt was fabricated with the same configuration as Example 6 except that the backing rubber layer had a thickness of 0.6 mm.

Example 10

As Example 10, a V-ribbed belt was fabricated with the same configuration as Example 6 except that the backing rubber layer had a thickness of 0.7 mm.

Example 11

As Example 11, a V-ribbed belt was fabricated with the same configuration as Example 6 except that the backing rubber layer had a thickness of 0.8 mm.

(Test Evaluation Method)

Figure 5:
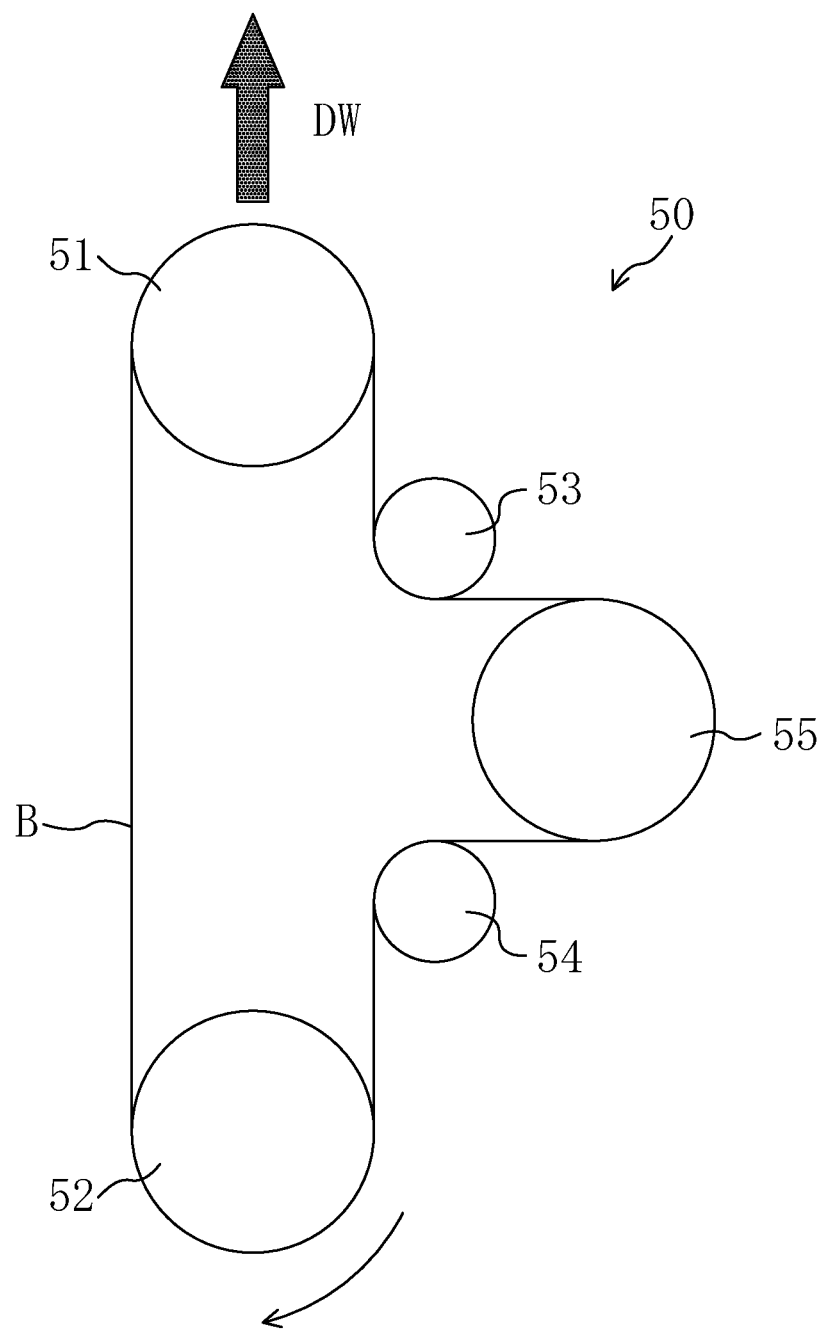
FIG. 5 is a diagram showing a layout of pulleys of a belt running tester in test evaluation 2.

FIG. 5 shows a layout of a belt running tester 50 used in the test evaluation 2.

The belt running tester 50 is formed by: upper and lower ribbed pulleys (the upper pulley is a tension pulley, and the lower pulley is a driving pulley) 51, 52 having a diameter of 45 mm; an idler pulley 53 having a diameter of 40 mm and placed on the lower right side of the ribbed pulley 51 at an intermediate position in the vertical direction between the ribbed pulleys 51, 52; an idler pulley 54 having a diameter of 40 mm and placed on the upper right side of the ribbed pulley 52 so as to be aligned with the idler pulley 53 in the vertical direction; and a ribbed pulley 55 (a driven pulley) having a diameter of 45 mm and placed on the right side of the idler pulleys 53, 54 at an intermediate position in the vertical direction between the ribbed pulleys 53, 54. The idler pulley 53 is positioned on the outer side of the belt so that the contact angle of the belt is 90 degrees, and that the V-ribbed belt thus wrapped around the idler pulley 53 extends upward in the vertical direction and rightward in the horizontal direction. Like the idler pulley 53, the idler pulley 54 is positioned on the outer side of the belt so that the contact angle of the belt is 90 degrees, and that the V-ribbed belt thus wrapped around the idler pulley 54 extends downward in the vertical direction and rightward in the horizontal direction.

Each of the V-ribbed belts of Examples 6-11 was wrapped around the three ribbed pulleys 51, 52, 55 and the two idler pulleys 53, 54, the ribbed pulley 51 was pulled upward so that dead load of 588 N was applied thereto, and the lower ribbed pulley 52 as the driving pulley was rotated clockwise at a rotational speed of 5,100 rpm at normal temperature. The time until cracks appeared in the back face of the belt was measured as "back face crack initiation time." Note that the test was stopped when the running time of the belt exceeded 500 hours.

(Test Evaluation Result)

Table 4 shows the result of test evaluation 2.

TABLE 4

|  | Examples | | | | | |
| --- | --- | --- | --- | --- | --- | --- |
|  | 6 | 7 | 8 | 9 | 10 | 11 |
| Thickness of Backing Rubber Layer (mm) | 0.3 | 0.4 | 0.5 | 0.6 | 0.7 | 0.8 |

TABLE 4-continued

| | Examples | | | | | |
|---|---|---|---|---|---|---|
| | 6 | 7 | 8 | 9 | 10 | 11 |
| Back Face Crack Initiation Time (h) | 500 or more | 500 or more | 500 or more | 410 | 360 | 300 |

Table 4 shows that in Examples 6-8 in which the thickness of the backing rubber layer is 0.3-0.5 mm, the time until cracks appeared in the backing rubber layer is longer than in Examples 9-11 in which the thickness of the backing rubber layer is 0.6-0.8 mm.

INDUSTRIAL APPLICABILITY

As described above, the present invention is useful for friction drive belts that have an adhesion rubber layer having a core wire embedded therein so as to form a helical pattern having a pitch in the lateral direction of the belt, a compression rubber layer provided on a surface of the adhesion rubber layer located on the inner side of the belt, and serving as a portion that is to contact pulleys, and a backing rubber layer provided on a surface of the adhesion rubber layer located on the outer side of the belt, and serving as a back portion of the belt.

DESCRIPTION OF REFERENCE CHARACTERS

B V-Ribbed Belt
10 V-Ribbed Belt Body
11 Adhesion Rubber Layer
23 Compression Rubber Layer
13 V-Shaped Rib (Portion that is to Contact Pulleys)
14 Short Fiber
16 Core Wire
17 Backing Rubber Layer

The invention claimed is:

1. A friction drive belt, comprising:
an adhesion rubber layer having a core wire embedded therein so as to form a helical pattern having a pitch in a lateral direction of the belt;
a compression rubber layer provided on a surface of the adhesion rubber layer located on an inner side of the belt that serves as a portion of the belt for contact with pulleys; and
a backing rubber layer provided on a surface of the adhesion rubber layer located on an outer side of the belt that serves as a back portion of the belt,
wherein a ratio of tensile stress at 10% elongation of a rubber composition forming the adhesion rubber layer to that of a rubber composition forming the backing rubber layer is 1.77 or more, as measured in a longitudinal direction of the belt at an ambient temperature of 25° C.

2. The friction drive belt of claim 1, wherein the backing rubber layer has a thickness of 0.3-0.5 mm.

3. The friction drive belt of claim 1, wherein the backing rubber layer is free of short fibers.

4. The friction drive belt of claim 2, wherein the backing rubber layer is free of short fibers.

5. The friction drive belt of claim 1, wherein the adhesion rubber layer is formed by a rubber composition of an ethylene-α-olefin elastomer as a material rubber.

6. The friction drive belt of claim 1, wherein the backing rubber layer is formed by a rubber composition of an ethylene-α-olefin elastomer as a material rubber.

7. The friction drive belt of claim 5, wherein the backing rubber layer is formed by a rubber composition of an ethylene-α-olefin elastomer as a material rubber.

8. The friction drive belt of claim 1, wherein the adhesion rubber layer, the compression rubber layer, and the backing rubber layer form a V-ribbed belt.

9. The friction drive belt of claim 2, wherein the adhesion rubber layer, the compression rubber layer, and the backing rubber layer form a V-ribbed belt.

10. The friction drive belt of claim 3, wherein the adhesion rubber layer, the compression rubber layer, and the backing rubber layer form a V-ribbed belt.

11. The friction drive belt of claim 4, wherein the adhesion rubber layer, the compression rubber layer, and the backing rubber layer form a V-ribbed belt.

12. The friction drive belt of claim 5, wherein the adhesion rubber layer, the compression rubber layer, and the backing rubber layer form a V-ribbed belt.

13. The friction drive belt of claim 6, wherein the adhesion rubber layer, the compression rubber layer, and the backing rubber layer form a V-ribbed belt.

14. The friction drive belt of claim 7, wherein the adhesion rubber layer, the compression rubber layer, and the backing rubber layer form a V-ribbed belt.

* * * * *